Nov. 18, 1958     W. O. CHENEY     2,860,600
DIVERTING FISH AIR BUBBLE SCREEN

Filed Feb. 7, 1955     3 Sheets-Sheet 1

INVENTOR.
WILLIAM O. CHENEY
BY
ATTORNEY

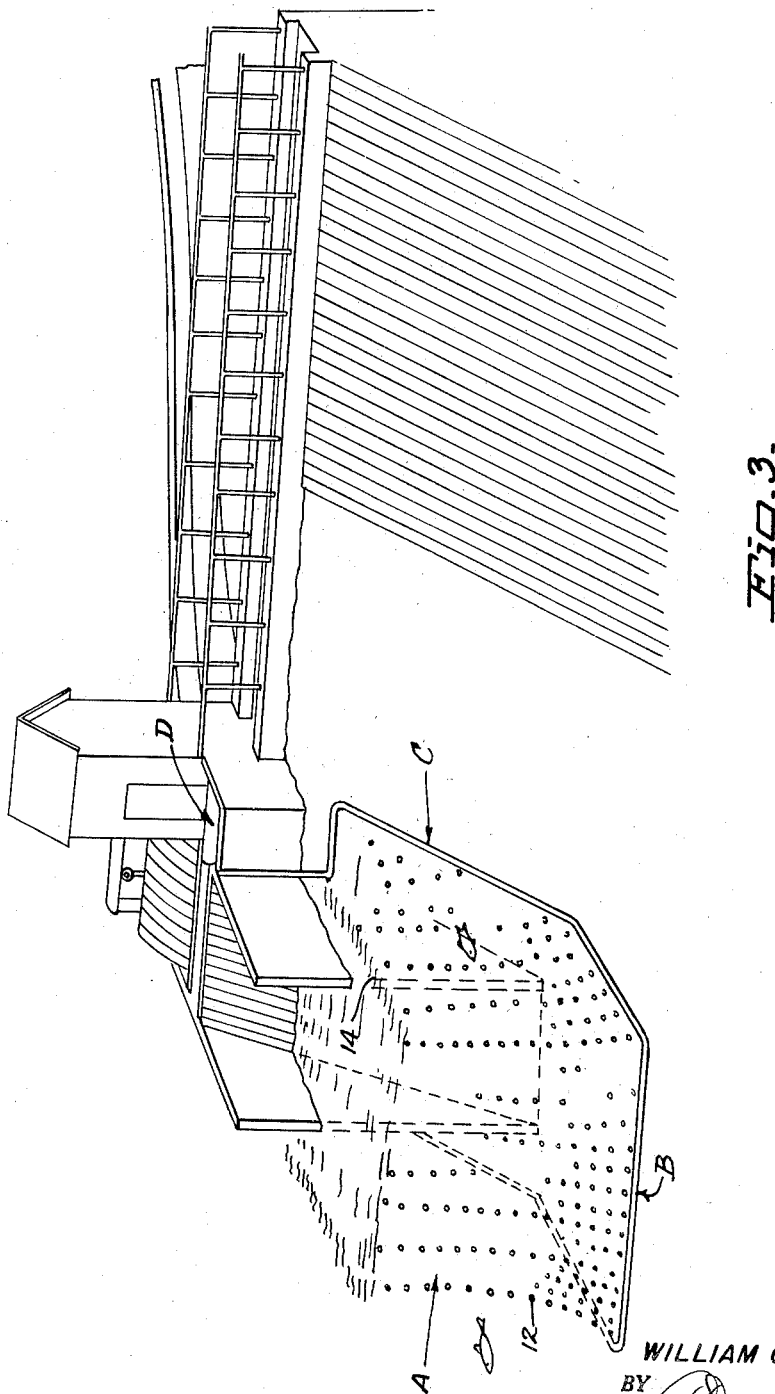

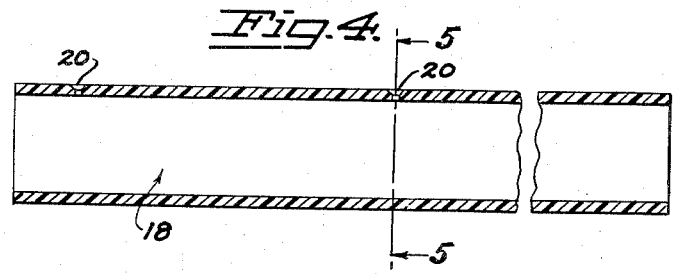
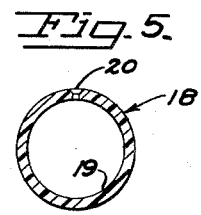
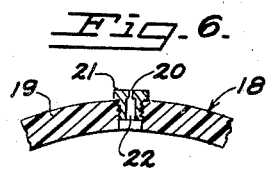
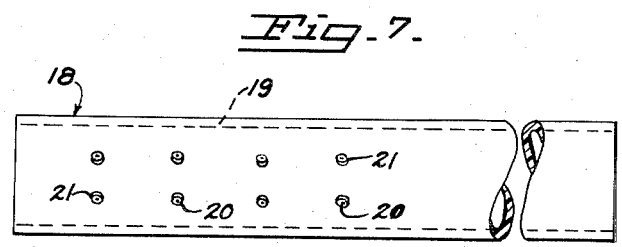
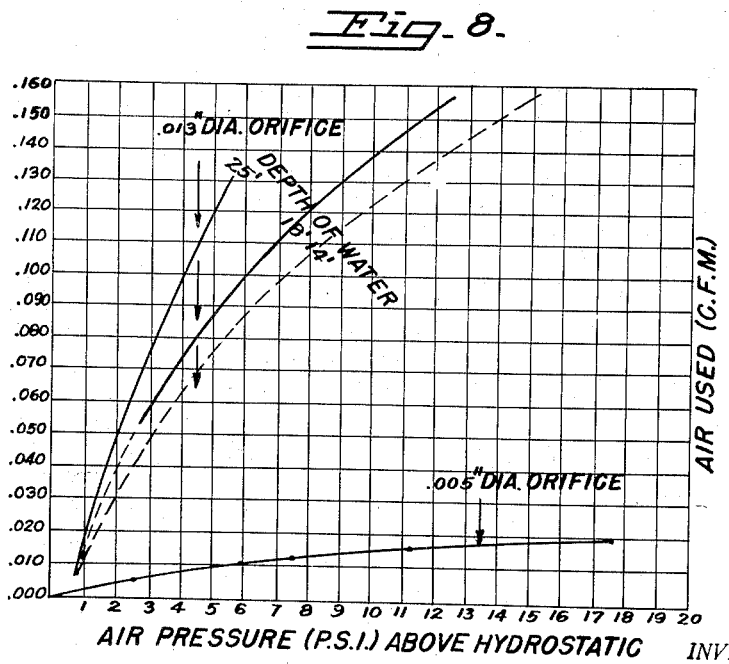

United States Patent Office 2,860,600
Patented Nov. 18, 1958

2,860,600

DIVERTING FISH AIR BUBBLE SCREEN

William O. Cheney, San Leandro, Calif., assignor to Pacific Gas and Electric Company, San Francisco, Calif., a corporation of California Application February 7, 1955, Serial No. 486,585

5 Claims. (Cl. 119—3)

This invention relates to a method and means for preventing fish, particularly resident fish, from entering the conduits and flumes of steam-electric, hydroelectric, irrigation, or other diversion conduits from rivers, streams, lakes, and bays or other bodies of water.

While the method and device herein described may also be useful in turning away anadromous or migrant fish, it is primarily designed for preventing the entry of resident fish into pipes, conduits or ditches along with water used for power or irrigation purposes. In contrast to devices for diverting migrant fish, where it is only necessary to momentarily direct, guide or scare the fish into an alternate path of travel, devices for turning away resident fish must produce a constant or continuing effect. As a result, some form of barrier which will repeatedly obstruct, prove unattractive, or scare such fish when randomly swimming or feeding near the barrier must be provided. The problem is complicated by the fact that resident fish, being constantly in the area, become accustomed to the usual devices for diverting migrant fish, such as flashing lights or noisemakers. For this reason, mechanisms for diverting resident fish have generally developed independently of such devices.

Previous efforts directed primarily towards screening hydroelectric or irrigation diversion conduits from resident fish have employed the following basic types of apparatus:

(1) Mechanical, as represented by fixed screens, rotary screens, or inclined screens with wipers or louver type deflectors. All such devices have the primary disadvantage of clogging during heavy debris flow, or of being washed out or damaged during periods of flood. As a result, such devices generally require extensive and continuous maintenance.

(2) Electrical, whereby an alternating, direct or pulsating current is applied to electrodes fixed or hanging in front of a diversion. Such electrical screens have the disadvantage of stunning or killing fish which venture too far into the electrical field. They also offer a real hazard to fisherman who venture into the vicinity, and may become inoperative with mechanical or electrical failure. Another defect is the variable repelling effect of the electrical field depending on the size of the fish approaching the screen.

The present invention operates on the principle that fish instictively avoid any marked disturbance in their natural swimming path and that such disturbances are sensed prior to the time that the fish actually enters the disturbed area. Accordingly, the essential embodiment of the invention is a disturbance both visual and physical, provided by an air bubble screen issuing from a series of orifices in an air conduit and forming an enclosure of the diversion portal. Such an air bubble fish screen is not affected in any way by debris or high water, and its screening effect is independent of the size of the fish approaching. Another advantage is that maintenance of the screen is a relatively simple matter provided a supply of filtered air is maintained. Another important advantage is that the possibility of losing the screen as a result of power failure is virtually eliminated since, particularly at hydroelectric plants, duplicate power sources are generally provided.

Other objects and advantages of the present invention will be apparent from the following description and from the drawings, in which:

Fig. 3 is a view in perspective of a smaller hydroelectric or irrigation diversion installation also embodying the invention;

Fig. 4 is a view in vertical section, broken away in part, of a length of plastic pipe that can provide the series of orifices employed in the present invention;

Fig. 5 is a view in transverse section along the line 5—5 of Fig. 4;

Fig. 6 is an enlarged view, similar to Fig. 5, of a portion of pipe employing a modified orifice construction;

Fig. 7 is a top plan view of a pipe construction, employing the orifice form of Fig. 6; and Fig. 8 is a graphic representation of typical data from which the air demand for a new installation employing the bubble screen of the invention may be calculated.

Figure 1:
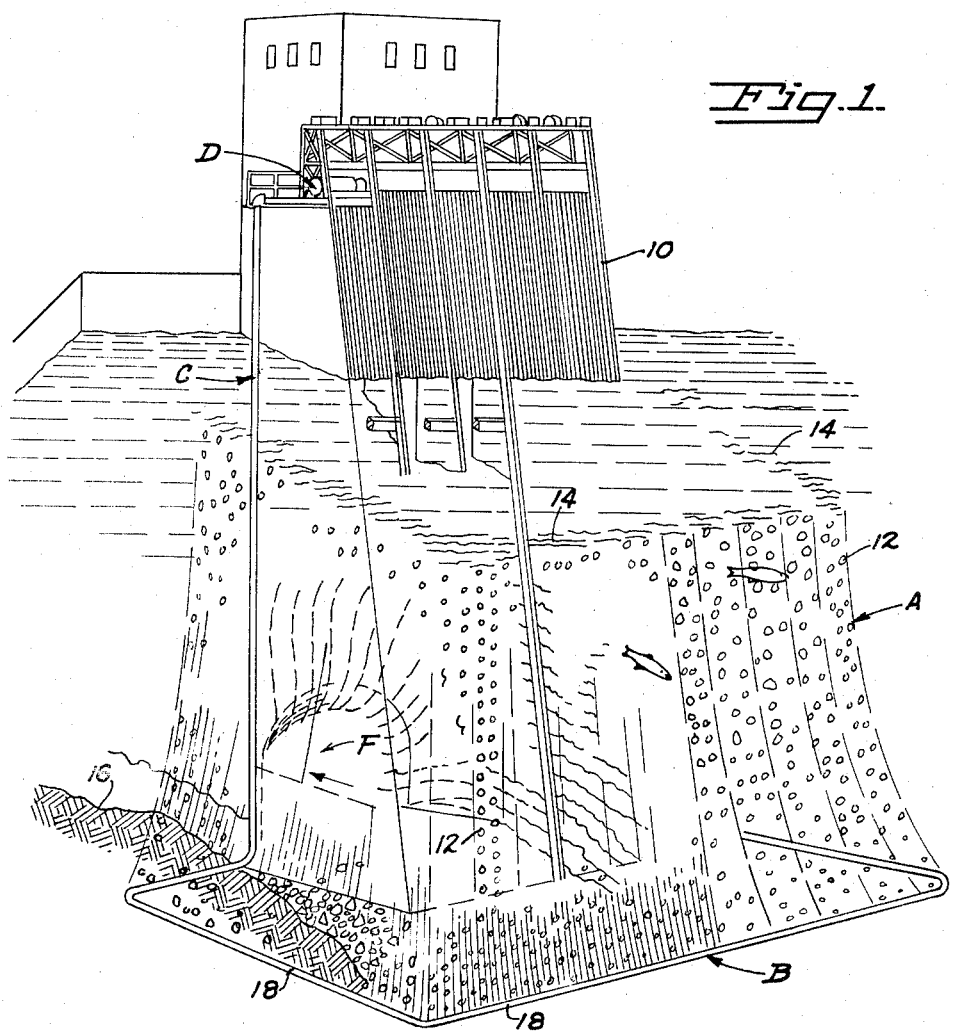
Fig. 1 is a view in perspective illustrating a large hydroelectric plant having its diversion conduit provided with apparatus embodying the principles of the invention.

Broadly, the present invention comprises an air bubble screen A issuing from a line or series of orifices in a perforated air conduit B and arranged in front of the intake of a hydroelectric, irrigation, or other fluid diversion conduit E so as to form an enclosure for the intake portal F. The conduit B is supplied by compressed air D, which may include an air compressor, tank, and air filter of any conventional design, and which is conveyed to the perforated conduit B by an air supply line C. In a preferred embodiment, the conduit B is constructed of corrosion resistant pipe, such as plastic pipe, with one or more rows of orifices provide in the top of the line. In use, the composite device is installed around the intake, at a distance approximately equal to the depth of the water, and compressed air admitted to the air supply line C issues from the conduit B in the form of closely adjacent or interlocking cylindrical columns of small bubbles. These bubbles rising through the water cause a disturbance in the water that is entirely foreign to the environment of fish normally swimming in the area. Consequently, fish approaching the air bubble screen both see and feel this disturbance and are effectively diverted away.

Referring now to the drawings in detail:

Fig. 1 illustrates the air bubble screen of the present invention screening a large hydroelectric installation. As shown, the main water passage into the plant is through tunnel portal F. Protecting the tunnel from the flow of debris is the usual trash rack 10 which extends to the bottom of the screen. The air supply D may comprise an air compressor, tank and air filter and is supported on the trash rack superstructure. Supply line C extends from the air supply D down into the stream where it connects with the perforated conduit B. Preferably the perforated conduit B is laid on the bottom of the stream in line with the bottom of the intake F and is spaced in front of the intake F a distance approximately equal to the depth of the water. The perforated conduit B should completely encircle the portal F, and may be laid in any desired shape. It is most easily formed in the shape of a three-sided rectangle, as shown in Fig. 1. All that is necessary is that the air screen A emit air so the bubbles will rise through the water completely surrounding the intake F to form a sufficient barrier to prevent fish from avoiding the bubble screen by darting around its sides or under it and into the tunnel F.

Figure 2:
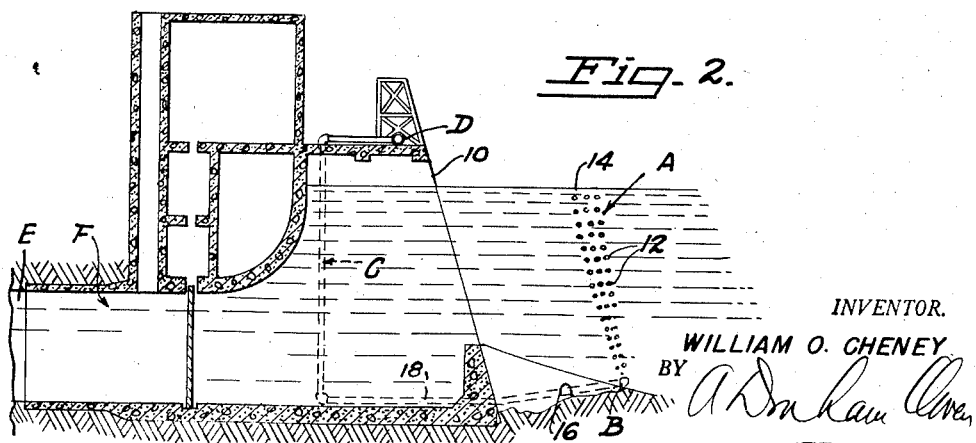
Fig. 2 is a view on a reduced scale in vertical section of the diversion of Fig. 1.

Air, preferably at a pressure of about 10 lbs. per square inch above the hydrostatic head is admitted to the air supply line C and issues from the ports in the perforated conduit B as continuous adjacent chains of small air filled bubbles 12. These air filled bubble chains 12, interlocking or intermingling as they rise through the water, are diverted from their vertical path by the water flowing into the diversion intake F and emerge at 14 on the surface of the stream near the trash rack 10 (Fig. 2). Preferably the perforated conduit B is placed on the bottom 16 of the stream, so the air filled bubble chains will extend from a point adjacent the bottom to the surface of the stream, thereby presenting an uninterrupted bubble screen in the path of fish attempting to enter the diversion intake F.

The perforated conduit B may be constructed from any suitable material such as metal or other flexible pipe or conduits. Preferably, however, sections of plastic pipe 18 are employed so as to prevent corrosion and consequent clogging of the orifice nozzles with corrosion products. Plastic pipe sections of a type suitable for use in perforated conduit B are shown in Figs. 4 to 7. Figs. 4 and 5 illustrate a particular pipe construction in which a single line of orifices 20 is provided. In this construction the orifices are made by drilling a small hole through the pipe with a counterbore provided from the outside of the pipe to a depth approximately one-half the wall thickness of the pipe. For example, in ¾ inch plastic pipe the preferred size of the orifices would be 0.005 to .010 inch holes spaced at 2½ inch intervals along the length of the pipe, with the counterbores being provided with a No. 60 drill.

Figs. 6 and 7 illustrate an alternate form for the pipe sections forming the perforated conduit B. In this form each orifice is a threaded tip 21 made on a screw machine and threaded into a tapped hole in the wall 19 of the pipe so that each orifice may be replaced in case of clogging. In ¾ inch pipe each orifice tip would be a ¼ inch screw of brass or plastic material counterbored with a No. 32 drill as at 22. At the base of the counterbore is drilled a 0.005 to .010 inch orifice 20.

It will be understood that the size and dimensions of the pipe sections 18 and orifices 20 forming the perforated conduit B may vary greatly depending upon the particular application. Thus, the air demand from air supply D will be related to water depth and flow from the conduit B. Similarly, the character of the air bubble screen will depend upon several factors: the depth of water above the conduit B; the hydrostatic pressure adjacent the conduit B; and the total air pressure supplied at the conduit B orifices. These factors determine, in addition, the optimum air pressure above hydrostatic pressure at the conduit B and the air delivery through the orifices. Experimental data for a typical application, such as that illustrated in Fig. 1, are set forth in Table I and graphically illustrated in Fig. 8. In collecting this data the depth of the conduit B, air pressure at the orifices, and the orifice diameters were varied in the manner indicated.

From data of the type presented in Table I and Fig. 8, the air demand for any installation may be calculated. Thus, the particular data set forth above indicates that when an orifice size of 0.005 inch is used, the air demand varies only slightly with the depth of water. For larger orifice sizes the air demand tends to vary considerably more with the depth of the water, greater pressure differentials above the hydrostatic head being required as the depth is increased.

From the above description it will be apparent that an air bubble fish screen may be provided, for hydroelectric, steam electric, irrigation, or other type of diversion conduits, which is in no way affected by changing conditions in a flowing stream. Accordingly, a substantial increase in the amount of debris flowing in the stream will not decrease the fish diverting effect of the air bubble screen since the debris will pass freely through the rising bubbles, lodging on the trash screen 10. Similarly, a rise or fall in the water level will not affect the air bubble screen since the bubbles will rise from the orifices to the surface in any event.

Another advantage inherent in the air bubble fish screen is that its diverting effect is independent of the size of the fish approaching the screen. Regardless of size, fish normally swimming in the quiet of the reservoir, when approaching the air bubble screen, will sense the disturbance to their normal environment produced by the rising bubbles, and be diverted away.

Another important advantage of an air bubble fish screen is that the screen requires very little maintenance since there are relatively few moving parts to get out of order. In addition, the only power and supply requirements are those necessary to provide a sufficient supply of filtered air. As duplicate power sources are generally provided for most hydroelectric installations, the possibility of loss of the air screen in cases of power failure is also substantially eliminated. These many advantages, plus the fact that clogging of the nozzles with corrosion products may be virtually eliminated by the use of plastic pipe in the air supply and nozzle lines, make possible a unique, economical fish screen of vastly improved operating characteristics.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination with an intake portal from a body of water, a perforated conduit adjacent the bottom of said body of water and substantially completely surrounding said intake portal, and a source of compressed air connected to said perforated conduit, whereby a curtain of air bubbles surrounding said intake portal will be produced to deter passage of fish from said body of water to said intake portal.

2. The device of claim 1 in which the curtain of air bubbles comprises a substantially continuous series of adjacent columns of small air bubbles.

3. The device of claim 1 in which said conduit rests on substantially the same level as the bottom of said intake portal and is spaced therefrom a horizontal distance approximately equal to the depth of said body of water adjacent said intake portal.

4. The device of claim 1 wherein said perforated conduit is fabricated from a corrosion-resistant synthetic material.

TABLE I

*Experimental data for determining orifice size*

| Stream depth above orifice, ft. | Hydrostatic pressure (p. s. i.) | Total air pressure (p. s. i.) | Air pressure above static (p. s. i.) | Air delivered per orifice (cubic ft./min.) | Orifice diameter (in.) |
|---|---|---|---|---|---|
| 25 | 10.8 | 11.5 | 0.7 | .007 | .013 |
| 25 | 10.7 | 13.2 | 2.5 | .062 | .013 |
| 25 | 10.3 | 16.2 | 5.4 | .130 | .013 |
| 18 | 7.9 | 20.3 | 12.4 | .156 | .013 |
| 18 | 7.9 | 14.8 | 6.4 | .107 | .013 |
| 18 | 7.9 | 10.7 | 2.8 | .055 | .013 |
| 14 | 6.3 | 9.5 | 3.2 | .062 | .013 |
| 14 | 6.3 | 15.2 | 8.9 | .091 | .013 |
| 14 | 6.3 | 20.0 | 13.7 | .160 | .013 |
| 32 | 12.5 | 30.0 | 17.5 | .019 | .005 |
| 32 | 12.5 | 20.0 | 7.5 | .012 | .005 |
| 32 | 12.5 | 15.0 | 2.5 | .006 | .005 |
| 22 | 9.2 | 15.2 | 6.0 | .009 | .005 |
| 22 | 9.2 | 20.4 | 11.2 | .014 | .005 |
| 22 | 9.2 | 29.5 | 20.3 | .019 | .005 |

5. The device of claim 1 in which said perforated conduit is provided with a series of orifices approximately 0.005 to 0.010 inch in diameter, through which said air passes out to form said curtain of air bubbles.

References Cited in the file of this patent

UNITED STATES PATENTS

| | | |
|---|---|---|
| 299,765 | Evans | June 3, 1884 |
| 950,999 | Erlwein | Mar. 1, 1910 |
| 1,616,125 | Holman | Feb. 1, 1927 |
| 2,008,363 | Maris | July 16, 1935 |
| 2,193,915 | Baker | Mar. 19, 1940 |
| 2,594,474 | McGrath | Apr. 29, 1952 |
| 2,605,742 | Burkey | Aug. 5, 1952 |
| 2,612,861 | Burkey | Oct. 7, 1952 |
| 2,709,984 | Marks | June 7, 1955 |
| 2,751,881 | Burkey | June 26, 1956 |